(12) United States Patent
Calvignac et al.

(10) Patent No.: US 7,130,916 B2
(45) Date of Patent: Oct. 31, 2006

(54) LINKING FRAME DATA BY INSERTING QUALIFIERS IN CONTROL BLOCKS

(75) Inventors: Jean Louis Calvignac, Cary, NC (US); Marco C. Heddes, Raleigh, NC (US); Joseph Franklin Logan, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 09/791,336

(22) Filed: Feb. 23, 2001

(65) Prior Publication Data

US 2002/0118694 A1 Aug. 29, 2002

(51) Int. Cl.
| | |
|---|---|
| G06F 15/167 | (2006.01) |
| G06F 12/00 | (2006.01) |
| G06F 12/16 | (2006.01) |
| G06F 13/28 | (2006.01) |
| G06F 9/44 | (2006.01) |
| H04L 12/54 | (2006.01) |
| G06F 15/16 | (2006.01) |
| G06F 12/14 | (2006.01) |
| G06F 13/00 | (2006.01) |
| G06F 3/00 | (2006.01) |
| G06F 9/46 | (2006.01) |

(52) U.S. Cl. ............... 709/234; 709/213; 711/147; 370/429; 719/314

(58) Field of Classification Search ........... 709/213, 709/234; 711/147; 370/429; 719/314

See application file for complete search history.

(56) References Cited

U.S. PATENT DOCUMENTS

| | | | |
|---|---|---|---|
| 4,168,469 A | | 9/1979 | Parikh et al. |
| 4,703,475 A | | 10/1987 | Dretzka et al. |
| 5,247,516 A | * | 9/1993 | Bernstein et al. ........... 370/468 |
| 5,333,269 A | | 7/1994 | Calvignac et al. |

(Continued)

FOREIGN PATENT DOCUMENTS

EP 0797335 A2 9/1997

OTHER PUBLICATIONS

Gab-Joong-Jeong et al., "Reconfigurable shared buffer ATM switch", IEEE Proceedings of AP-ASIC'99, p. 327-330, Aug. 1999.*

*Primary Examiner*—Jason Cardone
*Assistant Examiner*—Melvin H. Pollack
(74) *Attorney, Agent, or Firm*—Robert A. Voigt, Jr.; Winstead Sechrest & Minick PC

(57) ABSTRACT

A method and system for reducing memory accesses by inserting qualifiers in control blocks. In one embodiment, a system comprises a processor configured to process frames of data. The processor may comprise a plurality of buffers configured to store frames of data where each frame of data may be associated with a frame control block. Each frame control block associated with a frame of data may be associated with one or more buffer control blocks. Each control block, e.g., frame control block, buffer control block, may comprise one or more qualifier fields that comprise information unrelated to the current control block. Instead, qualifiers may comprise information related to an another control block. The last frame control block in a queue as well as the last buffer control block associated with a frame control block may comprise fields with no information thereby reducing memory accesses to access information in those fields.

10 Claims, 4 Drawing Sheets

U.S. PATENT DOCUMENTS

| | | |
|---|---|---|
| 5,410,677 A | 4/1995 | Roskowski et al. |
| 5,440,545 A * | 8/1995 | Buchholz et al. ............ 370/426 |
| 5,551,020 A | 8/1996 | Flax et al. |
| 5,553,302 A * | 9/1996 | Morrissey et al. .............. 710/5 |
| 5,559,963 A * | 9/1996 | Gregg et al. ................ 709/234 |
| 5,561,807 A | 10/1996 | Verplanken et al. |
| 5,574,905 A | 11/1996 | deCarmo |
| 5,617,537 A * | 4/1997 | Yamada et al. ............. 709/214 |
| 5,651,002 A * | 7/1997 | Van Seters et al. ......... 370/392 |
| 5,794,018 A * | 8/1998 | Vrvilo et al. ................ 713/400 |
| 5,812,775 A * | 9/1998 | Van Seters et al. ......... 709/213 |
| 5,832,310 A * | 11/1998 | Morrissey et al. ............. 710/71 |
| 6,038,592 A * | 3/2000 | Verplanken et al. ........ 709/215 |
| 6,330,584 B1 * | 12/2001 | Joffe et al. ................... 718/107 |
| 6,400,715 B1 * | 6/2002 | Beaudoin et al. ............ 370/392 |
| 6,434,145 B1 * | 8/2002 | Opsasnick et al. .......... 370/394 |
| 6,477,584 B1 * | 11/2002 | Hickerson ................... 719/314 |
| 6,519,686 B1 * | 2/2003 | Woodring et al. ........... 711/147 |
| 6,532,185 B1 * | 3/2003 | Calvignac et al. ..... 365/230.03 |
| 6,658,546 B1 * | 12/2003 | Calvignac et al. .......... 711/170 |
| 6,681,340 B1 * | 1/2004 | Calvignac et al. ............ 714/18 |
| 6,879,579 B1 * | 4/2005 | Myles et al. ................. 370/348 |
| 7,055,151 B1 * | 5/2006 | Joffe et al. ................... 718/104 |
| 2002/0118694 A1 * | 8/2002 | Calvignac et al. .......... 370/428 |

* cited by examiner

LINKING FRAME DATA BY INSERTING QUALIFIERS IN CONTROL BLOCKS

CROSS REFERENCE TO RELATED APPLICATIONS

The present invention is related to the following U.S. patent applications which are incorporated herein by reference:

Ser. No. 09/792,494 entitled "Assignment of Packet Descriptor Field Positions in a Network Processor" filed Feb. 23, 2001.

Ser. No. 09/792,557 entitled "Storing Frame Modification Information in a Bank in Memory" filed Feb. 23, 2001.

Ser. No. 09/792,533 entitled "Efficient Implementation of Error Correction Code Scheme" filed Feb. 23, 2001.

TECHNICAL FIELD

The present invention relates to the field of a networking communication system, and more particularly to inserting qualifiers in control blocks to reduce memory accesses and thereby improve the efficiency of the bandwidth of the memory.

BACKGROUND INFORMATION

A packet switching network has switching points or nodes for transmission of data among senders and receivers connected to the network. The switching performed by these switching points is in fact the action of passing on packets or "frames" of data received by a switching point or node to a further node in the network. Such switching actions are the means by which communication data is moved through the packet switching network.

Each node may comprise a packet processor configured to process packets or frames of data. The packet processor may comprise a data storage unit, e.g., Double Data Rate Static Random Access Memory (DDR SRAM), configured with a plurality of buffers to store frame data. Each frame of data may be associated with a Frame Control Block (FCB) configured to describe the corresponding frame of data. Each FCB may be associated with one or more Buffer Control Blocks (BCBs) where each BCB associated with an FCB may be associated with a buffer in the data storage unit. A BCB may be configured to describe the associated buffer. Typically, FCBs and BCBs comprise various fields of information where the fields of information in FCBs and BCBs are each supplied by a separate memory, e.g., Quadruple Data Rate Static Random Access Memory (QDR SRAM), in the packet processor. That is, the fields of information in FCBs and BCBs may be obtained by accessing a separate memory, e.g., QDR SRAM, in the packet processor.

It would therefore be desirable to reduce the number of accesses to a particular memory, e.g., QDR SRAM, that supplies information to the fields of FCBs or BCBs thereby improving the efficiency of the bandwidth of the memory, e.g., QDR SRAM.

SUMMARY

The problems outlined above may at least in part be solved in some embodiments by inserting qualifiers in control blocks, e.g., frame control blocks, buffer control blocks, that comprise information unrelated to the current control block. Instead, qualifiers in control blocks, e.g., frame control blocks, buffer control blocks, may comprise information related to another control block or to a buffer associated with a next control block. The last frame control block in a queue in the packet processor as well as the last buffer control block associated with a frame control block may comprise fields with no information thereby reducing memory accesses to a memory, e.g., QDR SRAM, to access information to be inserted in those fields. Subsequently, the bandwidth of the memory, e.g., QDR SRAM supplying information to those fields is improved.

In one embodiment, a system comprises a packet processor configured to process packets, i.e., frames, of data. The processor may comprise a plurality of buffers configured to store frames of data where each frame of data may be associated with a frame control block. Each frame control block associated with a frame of data may be associated with one or more buffer control blocks. Each buffer control block associated with a frame control block may be associated with a particular buffer of the plurality of buffers. The processor may further comprise a plurality of queues configured to temporarily store one or more frame control blocks. Each control block, e.g., frame control block, buffer control block, may comprise one or more qualifier fields that comprise information related to a particular buffer in the plurality of buffers.

Each frame control block may comprise one or more qualifier fields where the one or more qualifier fields comprise information unrelated to a current frame control block. In all but the last frame control block in a particular queue, the one or more qualifier fields may comprise information as to the byte count length of the one or more buffer control blocks associated with a next frame control block. In the one or more frame control blocks in a particular queue, the one or more qualifier fields may comprise information as to a starting byte position and to an ending byte position of framed data stored in a particular buffer associated with the first buffer control block which is associated with the frame control block.

In another embodiment of the present invention, each buffer control block may comprise one or more qualifier fields. In all but the last buffer control block associated with a frame control block, the one or more qualifier fields may comprise information as to a starting byte position and to an ending byte position of frame data stored in a particular buffer associated with a next buffer control block.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and system for reducing memory accesses by inserting qualifiers in control blocks. In one embodiment, a system comprises a packet processor configured to process packets, i.e., frames, of data. The processor may comprise a plurality of buffers configured to store frames of data where each frame of data may be associated with a frame control block. Each frame control block associated with a frame of data may be associated with one or more buffer control blocks. Each buffer control block associated with a frame control block may be associated with a particular buffer of the plurality of buffers. Each control block, e.g., frame control blocks, buffer control blocks, may comprise one or more qualifier fields. The one or more qualifier fields may comprise information unrelated to the current control block. Instead, qualifiers in control blocks, e.g., frame control blocks, buffer control blocks, may comprise information related to another control block. By inserting qualifiers storing information related to another control block, the last frame control block in a queue in the packet processor as well as the last buffer control block associated with a frame control block may comprise fields with no information thereby reducing memory accesses to a memory, e.g., QDR SRAM, to access information to be inserted in those fields. Subsequently, the bandwidth of the memory, e.g., QDR SRAM, supplying information to those fields is improved.

Figure 1:
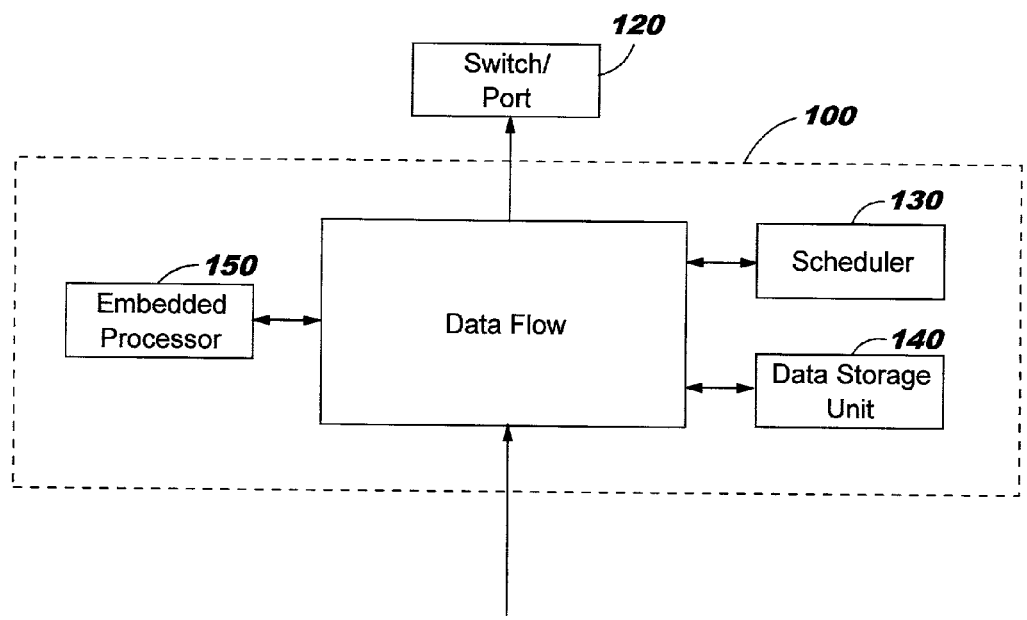
FIG. 1 illustrates a packet processor configured in accordance with the present invention.

FIG. 1—Packet Processor

FIG. 1 illustrates an embodiment of the present invention of a packet processor 100. Packet processor 100 may comprise a data flow unit 110 configured to receive digital packets, i.e., frames, of data, from a particular switch (not shown) or port (not shown) of a packet switching network and transmit the digital packets, i.e., frames, of data to another switch or port, e.g., switch/port 120, in the packet switching network. Each frame of data may be associated with a Frame Control Block (FCB) where the FCB describes the associated frame of data. Each FCB associated with a frame of data may be associated with one or more Buffer Control Blocks (BCBs) where each BCB associated with an FCB may be associated with a buffer in a data storage unit 140. A BCB may be configured to describe the buffer associated with the next chained BCB as described in the description of FIGS. 3 and 4. In one embodiment, data flow unit 110 may reside on an integrated circuit, i.e., integrated chip. Data flow unit 110 may be coupled to data storage unit 140 configured to temporarily store frames of data received by data flow unit 110 from a switch (not shown) or port (not shown) in the packet switching network. Data flow unit 110 may further be coupled to a scheduler 130 configured to schedule frames of data to be transmitted from data flow unit 110 to switch/port 120. In one embodiment, scheduler 130 may reside on an integrated circuit, i.e., integrated chip. Furthermore, data flow unit 110 may further be coupled to an embedded processor 150 configured to process frames of data received by data flow unit 110.

Figure 2:
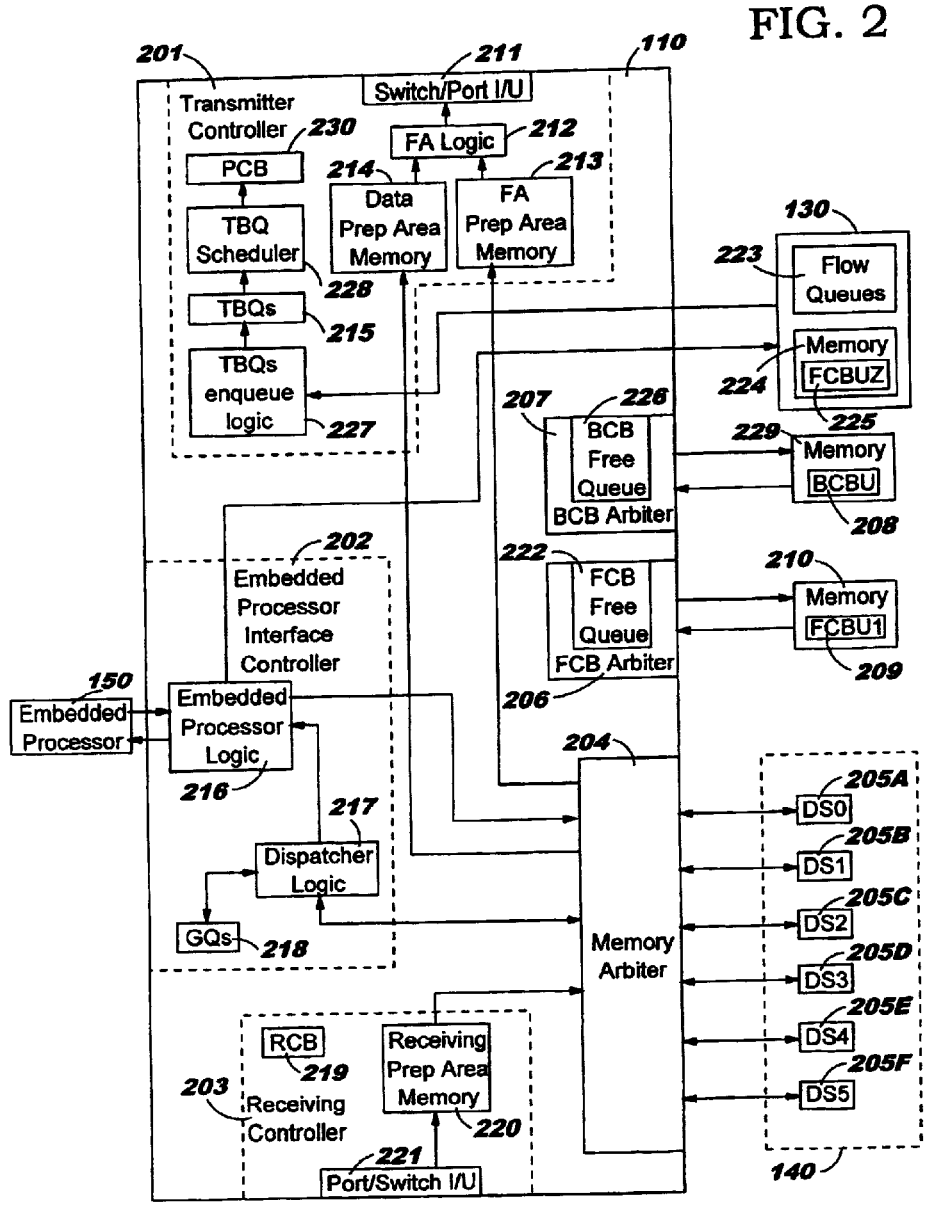
FIG. 2 illustrates a data flow unit configured in accordance with the present invention.

FIG. 2—Data Flow Unit

FIG. 2 illustrates an embodiment of the present invention of data flow unit 110. Data flow unit 110 may comprise a receiver controller 203 configured to receive and temporarily store packets, i.e., frames, of data received from a switch (not shown) or port (not shown) in a packet switching network. Data flow unit 110 may further comprise a transmitter controller 201 configured to modify the frame data as well as transmit the modified frame data to a switch (not shown) or port (not shown) in a packet switching network. Data flow unit 110 may further comprise an embedded processor interface controller 202 configured to exchange frames to be processed by embedded processor 150.

Packets, i.e., frames, of data may be received by a port/switch interface unit 221. Port/switch interface unit 221 may receive data from a switch (not shown) in the packet switching network when data flow unit 110 operates in an egress mode. Otherwise, port/switch interface unit 221 may receive data from a port (not shown) that operates as an interface to the packet switching network when data flow unit 110 operates in an ingress mode. Data received by data flow unit 110 may be temporarily stored in a receiving preparation area memory 220 prior to being stored in data storage unit 140 which may be represented by a plurality of slices 205A–F. Slices 205A–F may collectively or individually be referred to as slices 205 or slice 205, respectively. The number of slices 205 in FIG. 2 is illustrative, and an embodiment of data flow unit 110 in accordance with the principles of the present invention may have other predetermined number of slices 205. Each slice may comprise a plurality of buffers. Each slice may represent a slice of memory, e.g., Dynamic Random Access Memory (DRAM), so that frame data may be written into different buffers in different slices in order to maximize memory bandwidth. A memory arbiter 204 may be configured to collect requests, e.g., read, write, from receiver controller 203, transmitter controller 201 and embedded processor interface controller 202 and subsequently schedule access to particular data store memory slices, i.e., particular buffers in particular slices 205. For example, receiver controller 203 may be configured to issue write requests to memory arbiter 204 in order to write received data into individual buffers in a particular slice 205.

As stated above, frame data may be stored in data storage unit 140, i.e., a plurality of slices 205. In one embodiment, frame data may be stored in one or more buffers in one or more slices 205 in a manner such that the data in each particular frame may be recomposed by having the buffers chained together. That is, data in a particular frame may be stored in one or more buffers that are chained together in the order that data is written into the one or more buffers. The chaining of the one or more buffers may be controlled by a Buffer Control Block Unit (BCBU) 208 in a memory 229, e.g., Quadruple Data Rate Static Random Access Memory (QDR SRAM), coupled to data flow unit 110. BCBU 208 may be configured to comprise the addresses of each of the one or more buffers chained together in the order data was written into buffers. The different buffers comprising data of the same frames may be linked together by means of pointers stored in BCBU 208.

As stated above, each frame of data may be associated with a Frame Control Block (FCB) where the FCB describes the associated frame of data. Frame Control Block Unit 1 (FCBU1) 209 in a memory 210, e.g., QDR SRAM, may be configured to store the information, e.g., frame control information, to be filled in the fields of the FCBs. That is, the fields of information in FCBs may be obtained by accessing memory 210, i.e., FCBU1 209 of memory 210. Additional details regarding FCBU1 209 of memory 210 storing fields of information are disclosed in U.S. patent application Ser. No. 09/792,494, filed on Feb. 23, 2001, entitled "Assignment of Packet Descriptor Field Positions in a Network Processor," which is hereby incorporated herein by reference in its entirety.

Frame data stored in buffers may be processed by embedded processor 150 by transmitting the header of each frame to be processed to embedded processor 150. As stated above, each frame of data may be represented by an FCB. These FCBs may be temporarily stored in G Queues (GQs) 218. Dispatcher logic 217 may be configured to dequeue the next FCB from GQs 218. Once dispatcher logic 217 dequeues the next FCB, dispatcher logic 217 issues a read request to memory arbiter 204 to read the data at the beginning of the frame, i.e., header of the frame, stored in data storage unit 140 associated with the dequeued FCB. The data read by dispatcher logic 217 is then processed by embedded processor 150.

Once frame data has been processed by embedded processor 150, the processed frame data may be temporarily stored in data storage unit 140, i.e., slices 205, by embedded processor logic 216 issuing a write request to memory arbiter 204 to write the processed frame data into individual buffers in one or more slices 205.

Once frame data has been processed by embedded processor 150, embedded processor logic 216 further issues the FCB associated with the processed frame to scheduler 130. Scheduler 130 may be configured to comprise flow queues 223 configured to store FCBs. Scheduler 130 may further comprise a Frame Control Block Unit 2 (FCBU2) 225 within a memory 224, e.g., QDR SRAM, configured to operate similarly as FCBU1 209. FCBU2 225 may be configured to store the information to be filled in the fields of the FCBs when the FCBs are temporarily residing in flow queues 223. Additional details regarding FCBU2 225 within memory 224 of scheduler 130 storing fields of information are disclosed in U.S. patent application Ser. No. 09/792,494, filed on Feb. 23. 2001, entitled "Assignment of Packet Descriptor Field Positions in a Network Processor". Scheduler 130 may be configured to transmit the FCBs stored in flow queues 223 to Target Blade Queues (TBQs) 215 enqueue logic 227 configured to enqueue the received FCBs in TBQs 215.

FCBs queued in TBQs 215 may be scheduled to be dequeued from TBQs 215 by TBQ scheduler 228 and loaded into Port Control Block (PCB) 230. TBQ scheduler 228 may be configured to dequeue the next FCB from TBQs 215 and enquene that FCB into PCB 230. Once the next FCB is enqueued into PCB 230, PCB 230 may issue a read request to memory arbiter 204 to read the data at the beginning of the frame, i.e., header of the frame, stored in data storage unit 140 associated with the dequeued FCB. The data read by PCB 230 may be temporarily stored in data preparation area memory 214 prior to transmitting the processed frame data to a switch (not shown) or port (not shown) in a packet switching network. It is noted for clarity that PCB 230 may be configured to read a portion of the data stored in the processed frame in each particular read request. That is, the entire data stored in the processed frame may be read in multiple read requests provided by PCB 230. Once the entire data stored in the processed frame is read, the data storage unit 140 may store additional frame data.

Transmitter controller 201 may further comprise a frame alteration preparation area memory 213 configured to receive commands to modify the processed frames temporarily stored in data preparation area memory 214. These commands are commonly referred to as frame modification commands which are issued by embedded processor 150 and stored in a particular bank in a particular buffer by embedded processor logic 216. Additional details regarding the storing of frame modification commands in a particular bank in a particular buffer are disclosed in U.S. patent application Ser. No. 09/792,557, filed on Feb. 23, 2001, entitled "Storing Frame Modification Information in a Bank in Memory," which is hereby incorporated herein by reference in its entirety. In one embodiment, PCB 224 may be configured to retrieve the frame modification commands stored in a particular bank in a particular buffer and store them in frame alteration preparation area memory 213. A Frame Alteration (FA) logic unit 212 may be configured to execute the commands stored in frame alteration preparation area memory 213 to modify the contents of the processed frames temporarily stored in data preparation area memory 214. Once FA logic 212 has modified the contents of the processed frames, then modified processed frames may be transmitted through a switch/port interface unit 211. Switch/port interface unit 211 may transmit data to a port (not shown) that operates as an interface to the packet switching network when data flow unit 110 operates in an egress mode. Otherwise, switch/port interface unit 211 may transmit data to a switch (not shown) in the packet switching network when data flow unit 110 operates in an ingress mode.

Data flow unit 110 may further comprise a Buffer Control Block (BCB) Arbiter 207 configured to arbitrate among different BCB requests from transmitter controller 201, embedded processor interface controller 202 and receiver controller 203 to read from or write to BCBU 208. BCB Arbiter 207 may be configured to schedule different accesses in order to utilize memory bandwidth as efficiently as possible. Data flow unit 110 may further comprise a Frame Control Block (FCB) Arbiter 206 configured to arbitrate among different FCB requests from embedded processor interface controller 202, receiver controller 203 and transmitter controller 201 to read from or write to FCBU1 209.

As stated above, each frame of data may be associated with an FCB. As the processed frames are read from data storage unit 140, e.g., DDR DRAM, and the processed frames are modified and transmitted to a switch (not shown) or a port (not shown) in the packet switching network, the FCB associated with such processed frame ceases to represent that particular frame of data. Once the FCB is no longer associated with frame data, the FCB may be stored in a FCB free queue 222 within FCB Arbiter 206. FCB free queue 222 may be configured to comprise a plurality of FCBs that are no longer associated with particular frame data. It is noted that FCB free queue 222 may comprise any number of FCBs that are no longer associated with particular frame data. Once data flow unit 110 receives a packet, i.e., frame, of data, a Reassembly Control Block (RCB) 219 of receiver controller 203 may associate a particular FCB from FCB free queue 222 with the received frame of data where the newly associated FCB may then be queued in GQs 218 by RCB 219.

As stated above, each frame of data may be associated with an FCB. Each FCB associated with a frame of data may be associated with one or more BCBs where each BCB associated with an FCB may be associated with a particular buffer of data storage unit 140. A BCB may be configured to describe the buffer associated with the next chained BCB as described in the discussion of FIGS. 3 and 4. Once the processed frame data stored in a buffer of data storage unit 140 has been retrieved by transmitter controller 201 and subsequently modified and transmitted to a switch (not shown) or port (not shown) in the packet switching network, the BCB associated with that particular buffer that no longer includes any frame data ceases to comprise any valid information. That is, the BCB associated with the particular buffer that no longer includes any frame data includes data that is no useful since the particular buffer associated with the BCB no longer includes any frame data. Once the BCB ceases to comprise any valid information, i.e., once the frame data in a particular buffer has been transmitted, the BCB may be stored in a BCB free queue 226 within BCB Arbiter 206. BCB free queue 226 may be configured to comprise a plurality of BCBs that do not comprise any valid information. It is noted that BCB free queue 226 may comprise any number of BCBs that do not comprise any valid information. Once receiver controller 203 receives frame data, RCB 219 of receiver controller 203 may retrieve a BCB in BCB free queue 226 so that RCB 219 may write the received frame data in the particular buffer associated with the BCB retrieved from BCB free queue 226.

As stated in the Background Information section, FCBs and BCBs may comprise various fields of information where the fields of information are supplied by a separate memory 210, i.e., FCBU1 209 of memory 210, and memory 229, i.e., BCBU 208 of memory 229, respectively. That is, the fields of information in FCBs may be obtained by accessing memory 210, i.e., FCBU1 209 of memory 210. The fields of information in BCBs may be obtained by accessing memory 229, i.e., BCBU 208 of memory 229. It would therefore be desirable to reduce the number of accesses to memories 210 and 229, e.g., QDR SRAM, that supplies information to the fields of FCBs and BCBs, respectively, thereby improving the efficiency of the bandwidth of memories 210 and 229. A diagram illustrating the reduction of memory accesses to memories 210 and 229 by inserting qualifiers in the fields of control blocks is described below.

Figure 3:
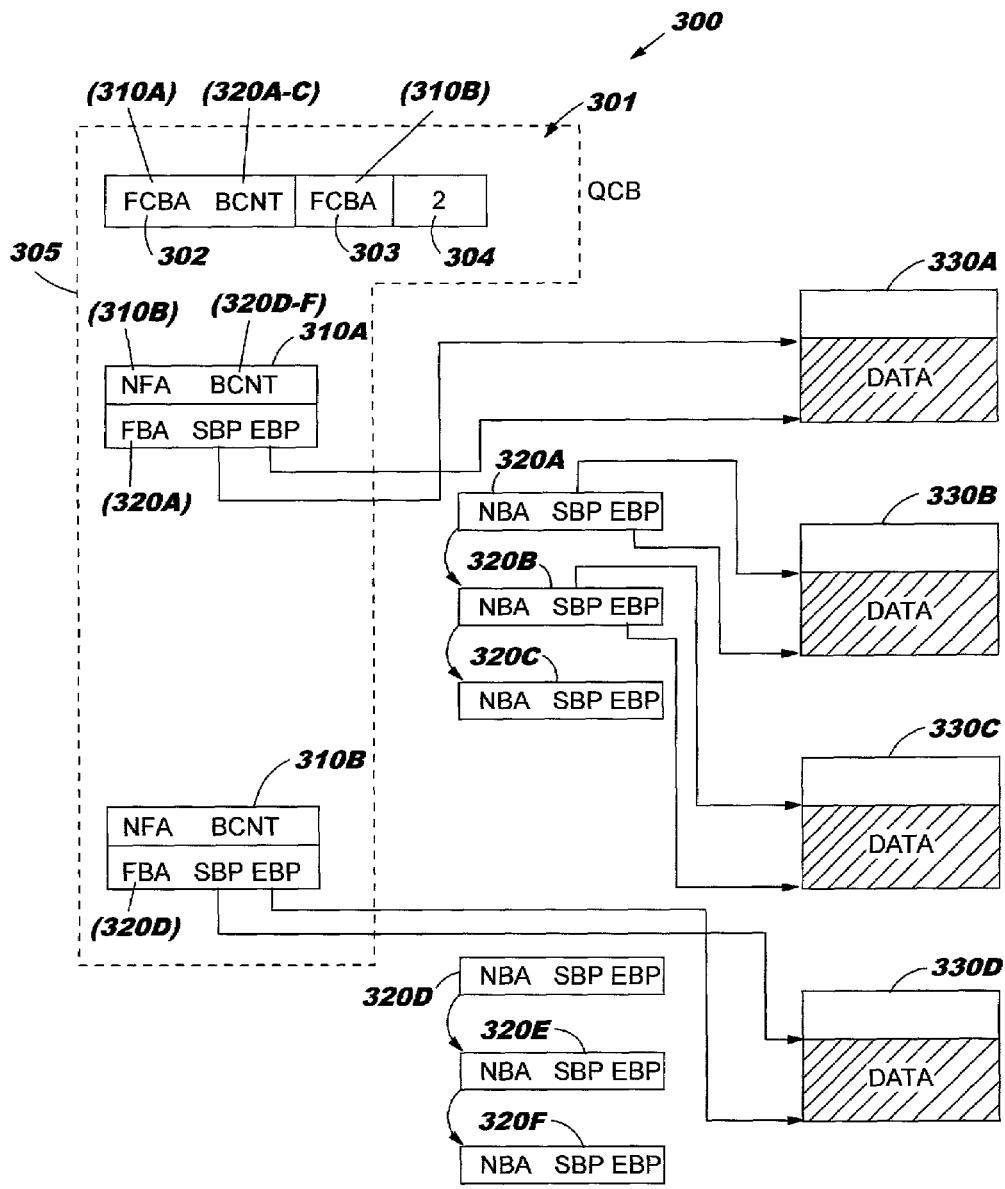
FIG. 3 is a diagram illustrating the reduction of memory accesses by linking frame data with qualifiers in control blocks.

FIG. 3—Diagram Illustrating the Reduction of Memory Accesses by Linking Frame Data with Qualifiers in Control Blocks FIG. 3 schematically illustrates an exemplary set 300 of control blocks depicting the inclusion of qualifiers in control blocks, e.g., FCB, BCB, in order to reduce accesses to memories 210 and 229 in accordance with the principles of the present invention. As stated above, FCBs may temporarily reside in a queue 305 which may be one of the following queues: FCB free queue 222, GQs 218, flow queues 223, and TBQs 215. In each of the above stated queues, i.e., FCB free queue 222, GQs 218, flow queues 223, TBQs 215, the queue has a control block commonly referred to as a Queue Control Block (QCB) 301 comprising information as to the number of FCBs that currently reside in that particular queue. It is noted that BCB free queue 226 may also comprise QCB 301. It is further noted that QCB 301 may comprise other information than the number of FCBs that currently reside that particular queue.

Referring to FIG. 3, QCB 301 may comprise a head field 302, a tail field 303 and a count field 304. Head field 302 may comprise an FCB Address (FCBA) of a first FCB, e.g., FCB 310A, located in the queue, e.g., FCB free queue 222, GQs 218, flow queues 223, TBQs 215, comprising QCB 301. (In the exemplary set 300 of FIG. 3, the notation (X) connected to certain fields of QCB 301, FCB 310A and FCB 310B, is used to denote that the particular field points to FCBX or comprises the byte count length of BCBsX.). Head field 302 may further comprise the Byte Count (BCNT) of the one or more BCBs, e.g., BCBs 320A–C, associated with the first FCB, e.g., FCB 310A, located in the queue, e.g., FCB free queue 222, GQs 218, flow queues 223, TBQs 215. The BCNT in head field 302 may be referred to as an qualifier as it identifies the byte count length of the one or more BCBs, e.g., BCBs 320A–C, associated with the first FCB, e.g., FCB 310A, in the queue 305 comprising QCB 301. Tail field 303 may comprise the FCB Address (FCBA) of last FCB, e.g., FCB 310B, in queue 305, e.g., FCB free queue 222, GQs 218, flow queues 223, TBQs 215, comprising QCB 301. Count field 304 may comprise the number of FCBs in queue 305 comprising QCB 301. Because in the exemplary set 300 of Figure there are two FCBs, e.g., FCB 310A–B, in queue 305 comprising QCB 301, count field 304 comprises the number two. As an ordinary skilled artisan would recognize, it is noted that the queues, e.g., FCB free queue 222, GQs 218, flow queues 223, TBQs 215, may comprise any number of FCBs and that FIG. 3 is illustrative. It is further noted that FCBs 310A–B may collectively or individually be referred to as FCBs 310 or FCB 310, respectively.

Each FCB 310 may comprise two entries or rows of fields. In each FCB 310, the first entry may comprise a field comprising a pointer to the Next FCB Address (NFA). The first entry may further comprise a field comprising the Byte Count (BCNT) length of the one or more BCBs associated with the next FCB 310. That is, instead of FCBs 310 storing the Byte Count length (BCNT) of the one or more BCBs associated with the current FCB 310, the BCNT field stores the byte count length of the one or more BCBs associated with the next FCB 310. For example, FCB 310A comprises the FCB address of the following FCB 310, e.g., FCB 310B, in the NFA field as well as the byte count length of the one or more BCBs, e.g., BCBs 320D–F, associated with the following FCB 310, e.g., FCB 310B, in the BCNT field. The BCNT field may be referred to as an qualifier as it identifies the byte count length of the one or more BCBs, e.g., BCBs 320D–F, associated with FCB 310B identified in the NFA field, i.e., the next FCB 310 in the chain of FCBs 310. FCB 310B does not comprise any information in the NFA field or in the BCNT field as there are no more FCBs 310 following FCB 310B. (This is denoted in the exemplary set 300 of FIG. 3 by "empty" parentheses "( )"). By not storing information in the NFA field and in the BCNT field of FCB 310B, memory accesses to memory 210 are reduced thereby improving the efficiency of the bandwidth of memory 210.

In each FCB 310, the second entry may comprise the fields of the First BCB Address (FBA) of the first BCB associated with that particular FCB, the Starting Byte Position (SBP) of the frame data stored in a buffer associated with the first BCB, and the Ending Byte Position (EBP) of the frame data stored in the buffer associated with the first BCB. Each FCB may be associated with one or more BCBs. Referring to FIG. 3, FCB 310A is associated with BCBs 320A–C. FCB 310B is associated with BCBs 320D–F. It is noted that FCBs may be associated with any number of BCBs and that FIG. 3 is illustrative, as would be recognized by an artisan of ordinary skill. It is further noted that BCBs 320A–F may collectively or individually be referred to as BCBs 320 or BCB 320, respectively. Each BCB 320 may be associated with a particular buffer in data storage unit 140. For example, BCB 320A is associated with buffer 330A. BCB 320B is associated with buffer 330B. BCB 320C is associated with buffer 330C. BCB 320D is associated with buffer 330D. BCB 320E is associated with buffer 330E. BCB 320F is associated with buffer 330F. Buffers 330A–F may collectively or individually be referred to as buffers 330 or buffer 330, respectively. It is noted that data storage unit 140 of packet processor 100 may comprise any number of slices 205 comprising any number of buffers 330. It is further noted that since there may be any number of buffers 330 there may be any number of BCBs 320 associated with those buffers 330. It is further noted that in one embodiment, each BCB 320 may be associated with a particular buffer 330 in data storage unit 140.

Referring to FCB 310A, the FBA field in the second entry may comprise the address of the first BCB 320, e.g., BCB 320A, associated with FCB 310A. FCB 310A may further comprise an SBP field storing the starting address of the frame data stored in the buffer 330, e.g., buffer 330A, associated with the first BCB 320, e.g., BCB 320A. FCB 310A may further comprise an EBP field storing the ending address of the frame data stored in the buffer 330, e.g., buffer 330A, associated with the first BCB 320, e.g., BCB 320A. The SBP and EBP fields may be referred to as qualifiers as they comprise information about the starting byte position and ending byte position of the frame data associated with the first BCB 320, e.g., BCB 320A, and not information about the current FCB 310, e.g., FCB 310A. Similarly, FCB 310B may comprise an FBA field in the second entry which comprises the address of the first BCB 320, e.g., BCB 320D, associated with FCB 310B. FCB 310B may further comprise an SBP field storing the starting address of the frame data stored in the buffer 330, e.g., buffer 330D, associated with the first BCB 320, e.g., BCB 320D. FCB 310B may further comprise an EBP field storing the ending address of the frame data stored in the buffer 330, e.g., buffer 330D, associated with the first BCB 320, e.g., BCB 320D. The SBP and EBP fields may be referred to as qualifiers as they comprise information about the starting byte position and ending byte position of the frame data associated with the first BCB 320, e.g., BCB 320D, and not information about the current FCB 310, e.g., FCB 310B.

As stated above, each FCB 310 may be associated with one or more BCBs 320. Referring to FIG. 3, FCB 310A is associated with BCBs 320A–C and FCB 310B is associated with BCBs 320D–F. Each BCB 320 may comprise three fields that are similar to the three fields in the second entry of FCBs 310. Each BCB 320 may comprise a pointer to the Next BCB Address (NBA) as well as the fields of SBP and EBP which are the starting and ending byte positions of the buffer 330 associated with the next BCB. The SBP and EBP fields may be referred to as qualifiers as they store the starting byte position and ending byte position of the buffer 330, e.g., buffer 330B, associated with the next BCB 320, e.g., BCB 320C. That is, instead of storing the starting and ending byte positions of the buffer 330, e.g., buffer 330B, associated with the current BCB 320, e.g., BCB 320B, thereby resulting an extra write access to memory 229, the starting and ending byte positions of the buffer 330, e.g., buffer 330B, associated with the next BCB 320, e.g., BCB 320B, is stored in the SBP and EBP fields, respectively, in the previous BCB 320, e.g., BCB 320A.

For example, BCB 320A comprises the BCB address of the next BCB 320, e.g., BCB 320B, in the NBA field as well as the starting byte position of the frame data stored in the buffer 330, e.g., buffer 330B, associated with the next BCB 320, e.g., BCB 320B, in the SBP field and the ending byte position of the frame data stored in the buffer 330, e.g., buffer 330B, associated with the next BCB, 320, e.g., BCB 320B, in the EBP field. BCB 320B comprises the BCB address of the next BCB 320, e.g., BCB 320C, in the NBA field as well as the starting byte position of the frame data stored in the buffer 330, e.g., buffer 330C, associated with the next BCB, e.g., BCB 320C, in the SBP field and the ending byte position of the frame data stored in the buffer 330, e.g., buffer 330C, associated with the next BCB 320, e.g., BCB 320C, in the EBP field. In the last BCB 320, e.g., BCB 320C, associated with an FCB, 310, e.g., FCB 310A, there is no information in the fields of NBA, SBP and EBP since there are no more BCBs 320 following the last BCB 320, e.g., BCB 320C. By not storing information in the NBA, SBP and EBP fields of the last BCB 320, e.g., BCB 320C, there is no information to be written into the fields of the last BCB 320, e.g., BCB 320C, associated with an FCB 310, e.g., FCB 310A, thereby reducing memory accesses to memory 229 and improving the efficiency of the bandwidth of memory 229.

Figure 4:
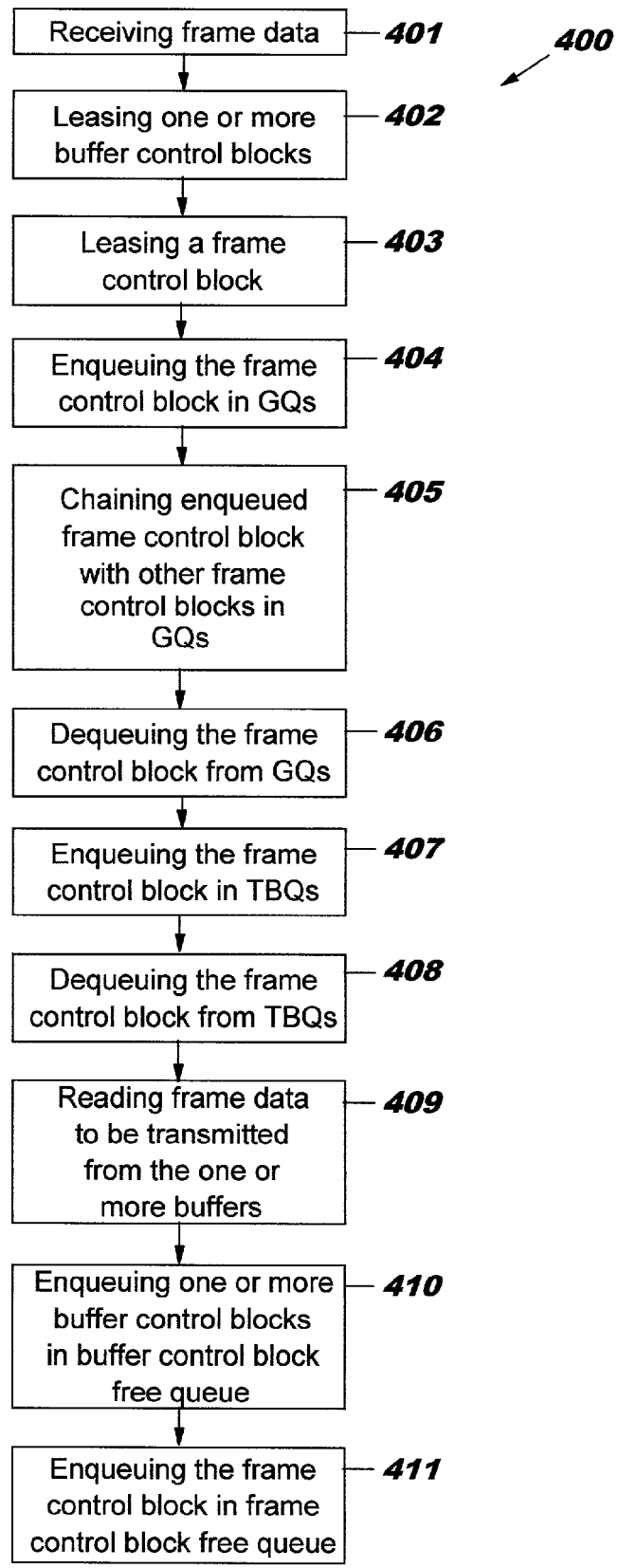
FIG. 4 is a flowchart of a method for reducing memory accesses by linking frame data with qualifiers in control blocks.

FIG. 4—Method for Reducing Memory Accesses by Linking Frame Data with Qualifiers in Control Blocks FIG. 4 illustrates a flowchart of one embodiment of the present invention of a method 400 for reducing memory accesses to memories 210 and 229 by linking frame data with qualifiers in control blocks, e.g., FCBs 310, BCBs 320.

In step 401, a frame of data may be received from a switch (not shown) or a port (not shown) in a packet switching network and temporarily stored in receiving preparation area memory 220 by receiver controller 203.

In step 402, RCB 219 of receiver controller 203 may be then be configured to lease one or more BCBs 320 from BCB free queue 226 (FIG. 2). A BCB may be said to be "leased" from BCB free queue 226 as the BCB may be temporarily removed from BCB free queue 226 during the "life cycle" of the FCB. Additional details regarding the "life cycle" of the FCB are disclosed in U.S. patent application Ser. No. 09/792,494, filed on Feb. 23, 2001, entitled "Assignment of Packet Descriptor Field Positions in a Network Processor". RCB 219 may then write the received data in one or more particular buffers 330 associated with the one or more BCBs 320 leased from BCB free queue 226. In one embodiment, RCB 219 may issue one or more write requests to memory arbiter 204 in order to write the received frame data into one or more buffers 330 associated with the one or more BCBs leased from BCB free queue 226.

As stated above, each particular buffer 330 may be associated with a particular BCB 320. BCB 320 may be configured as illustrated in FIG. 3 where BCB 320 may comprise the field of a Next BCB Address (NBA) which comprises a pointer to the next BCB 320 address as well as the fields of SBP and EBP which are the starting and ending byte positions of the buffer 330 associated with the next BCB 320. The SBP and EBP fields may be referred to as qualifiers as they store the starting byte position and ending byte position of the buffer 330 associated with the next BCB 320. That is, instead of storing the starting and ending byte positions of the buffer 330, e.g., buffer 330A (FIG. 3), associated with the current BCB 320, e.g., BCB 320A (FIG. 3), thereby resulting an extra write access to memory 229, the starting and ending byte positions of the buffer 330, e.g., buffer 330B (FIG. 3), associated with the next BCB 320, e.g., BCB 320B (FIG. 3), is stored in the SBP and EBP fields, respectively, in the previous BCB 320, e.g., BCB 320A (FIG. 3).

During each lease operation, i.e., each BCB 320 leased from BCB free queue 226 by RCB 219, RCB 219 may read the head field 302 in QCB 301 (FIG. 3) of BCB free queue 226. RCB 219 may then read the NBA field of the first BCB 320, e.g., BCB 320A, which may comprise the address of the next BCB 320 in the BCB free queue 226 to retrieve. Head field 302 of QCB 301 may subsequently be updated by RCB 219 so that the address in the head field 302 is the address of the next BCB 320 that may be retrieved during the next lease operation. The count field 304 of QCB 301 of BCB free queue 226 may then be decremented to indicate that a BCB 320 has been retrieved from BCB free queue 226. Head field 302 of QCB 301 may further comprise the Byte Count (BCNT) of the one or more BCBs 320, e.g., BCBs 320A–C (FIG. 3), associated with the one or more buffers 330, e.g., buffers 330A–C (FIG. 3), storing the frame of data. The BCNT in head field 302 may be referred to as an qualifier as it identifies the byte count length of the one or more BCBs 320, e.g., BCBs 320A–C (FIG. 3), associated with the one or more buffers 330, buffers 330A–C (FIG. 3), storing the frame of data and not information about the BCB free queue 226 comprising QCB 301. QCB 301 may further comprise a tail field 303 comprising the address of the last FCB, e.g., FCB 310B (FIG. 2), located in the queue, e.g., FCB free queue 222.

RCB 219 of receiver controller 203 may associate the one or more BCBs 320, e.g. BCBs 320A–C (FIG. 3), with an FCB 310 in step 403. RCB 219 may lease an FCB 310 from FCB free queue 222 (FIG. 2) thereby associating the leased FCB 310 with the one or more BCBs 320, e.g., BCBs 320A–C (FIG. 3), that are associated with the one or more buffers 205, e.g., buffers 205A–C (FIG. 3), storing the frame of data. An FCB may be said to be "leased" from FCB free queue 222 as the FCB may be temporarily removed from FCB free queue 222 during the "life cycle" of the FCB. Additional details regarding the "life cycle" of the FCB are disclosed in U.S. patent application Ser. No. 09/792,494, filed on Feb. 23. 2001, entitled "Assignment of Packet Descriptor Field Positions in a Network Processor". FCB 310 may be configured as illustrated in FIG. 3 with two entries or rows of fields. The first entry may comprise a field comprising a pointer to the Next FCB Address (NFA). The first entry may further comprise a field comprising the Byte Count (BCNT) length of the one or more BCBs 320, e.g., BCBs 320D–F (FIG. 3), associated with the next FCB 310. That is, instead of FCB 310 storing the Byte Count length (BCNT) of the one or more BCBs 320 associated with the current FCB 310, the BCNT field stores the byte count length of the one or more BCBs 320 associated with the next FCB 310. It is noted that the last FCB 310, e.g., FCB 3 lOB (FIG. 3), in the queue, e.g., FCB free queue 222 (FIG. 2), does not comprise any information in the NFA field or in the BCNT field as there are no more FCBs 310 following the last FCB 310, e.g., FCB 3 lOB (FIG. 3), in the queue, e.g., FCB free queue 222 (FIG. 2). By not storing information in the NFA field and in the BCNT field of the last FCB 310, e.g., FCB 3 lOB (FIG. 3), memory accesses to memory 210 are reduced thereby improving the bandwidth of memory 210. It is further noted that the last FCB 310, e.g., FCB 31 OB (FIG. 3), located in the queue, e.g., FCB free queue 222 (FIG. 2), may be identified in tail field 303 of QCB 301 (FIG. 3) of FCB free queue 222. As stated above, tail field 303 may comprise the address of the last FCB 310, e.g., FCB 310B (FIG. 2), located in the queue, e.g., FCB free queue 222.

The second entry of FCB 310 may comprise the fields of the First BCB Address (FBA) of the first BCB 320, e.g., BCB 320A (FIG. 3), associated with that particular FCB 310, the Starting Byte Position (SBP) of the frame data stored in buffer 330, e.g., buffer 330A (FIG. 3), associated with the first BCB 320, e.g., BCB 320A (FIG. 3), and the Ending Byte Position (EBP) of the frame data stored in buffer 330, e.g., buffer 330A (FIG. 3), associated with the first BCB 320, e.g., BCB 320A (FIG. 3). The SBP and EBP fields may be referred to as qualifiers as they comprise information about the starting byte position and ending byte position of the frame data associated with the first BCB 320, e.g., BCB 320A (FIG. 3), and not information about the current FCB 310, e.g., FCB 310A (FIG. 3).

In the lease operation, RCB 219 may read the head field 302 in QCB 301 of FCB free queue 222. Head field 302 may include the address of the first FCB 310, e.g., FCB 310A (FIG. 3), to retrieve from FCB free queue 222. RCB 219 may then read the NFA field of the first FCB 310, e.g., FCB 310A, which may comprise the address of the next FCB 310 in the FCB free queue 222 to retrieve. Head field 302 of QCB 301 may subsequently be updated so that the address in head field 302 is the address of the next FCB 310 that maybe retrieved during the next lease operation. The count field 304 of QCB 301 of FCB free queue 222 may then be decremented to indicate that a FCB 310 has been retrieved from FCB free queue 222 and enqueued in GQs 218.

In step 404, FCB 310 may be enqueued in GQs 218 by RCB 219. As illustrated in FIG. 3, FCB 310 may comprise the fields of FBA as well as the qualifiers SBP and EBP in the second entry. Once FCB 310 is enqueued in GQs 218, the information in these fields are copied from RCB 219. RCB 219 may store the starting and ending byte position of the frame data it stored in the first buffer 330, e.g., buffer 330A, associated with the first BCB 320, e.g., BCB 320A, associated with the FCB 310, e.g., FCB 310A, enqueued in GQs 218 by RCB 219 when RCB 219 writes the received frame data into the first buffer 330, e.g., buffer 330A, associated with the first BCB 320, e.g., BCB 320A, associated with the FCB 310, e.g., FCB 310A, enqueued in GQs 218 by RCB 219. Furthermore, the BCNT field in the first entry of FCB 310 may be copied from RCB 219.

FCB 310 enqueued in GQs 218 may then be chained together with the other FCBs 310 in GQs 218 in step 405. RCB 219 may read the tail field 303 in QCB 301 of GQs 218 to retrieve the address of the current last FCB 310 in GQs 218. The tail field 303 in QCB 301 of GQs 218 may subsequently be updated by RCB 219 so that the pointer in tail field 303 points to the FCB 310 just enqueued in GQs 218. The count field 304 of QCB 301 of GQs 218 may then be incremented by RCB 219 to indicate that an FCB 310 has been retrieved from FCB free queue 222 and enqueued in GQs 218.

In step 406, FCB 310 may be dequeued from GQs 218. Dispatcher logic 217 of embedded processor interface controller 202 may read the head field 302 of QCB 301 of GQs 218 to retrieve the address of the FCB 310 to dequeue. Dispatcher logic 217 may further read the NFA field in the FCB 310 to determine the address of the next FCB 310 in GQs 218 to dequeue. Dispatcher logic 217 may be configured to update the head field 302 of QCB 301 in GQs 218 so that the address in the head field 302 is the address of the next FCB 310 that may be dequeued at the next dequeue operation. The count field 304 of QCB 301 in GQs 218 maybe decremented to indicate that an FCB 301 has been dequeued from GQs 218. The contents of the dequeued FCB 310 may then be read by dispatcher logic 217 and transferred to embedded processor 150.

In step 407, the dequeued FCB 310 may be enqueued in TBQs 215. In another embodiment, FCB 310 may first be enqueued in flow queues 223 of scheduler 130 and then dequeued and enqueued in TBQs 215. Additional details regarding enqueing and dequeing the FCB 310 in flow queues 223 of scheduler 130 are disclosed in U.S. patent application Ser. No. 09/792,494, filed on Feb. 23, 2001, entitled "Assignment of Packet Descriptor Field Positions in a Network Processor".

In step 408, the enqueued FCB 310 in TBQs 215 may then be dequeued by TBQ scheduler 228 to be loaded into PCB 224 to be read by PCB 224 as discussed in the description of FIG. 2. In particular, the address in the FBA field of the FCB 310 may be loaded into PCB 224.

In step 409, the frame of data to be transmitted through switch/port interface unit 211 to a switch (not shown) or a port (not shown) in the packet switching network may be read from the one or more buffers 330 associated with the one or more BCBs 320, e.g., BCBs 320A–C (FIG. 3), by PCB 224. PCB retrieves the address of the first BCB 320, i.e., the address included in the FBA field of the FCB 310 dequeued in step 408, that was loaded into PCB 224. The address of the next BCB 320, e.g., BCB 320B (FIG. 3), may be located in the NBA field of the first BCB 320, e.g., BCB 320A (FIG. 3).

In step 410, when all the data of a frame is read by PCB from the one or more buffers 330 of data storage unit 140 that stored the frame of data, the one or more BCBs 320, e.g., BCBs 320A–C (FIG. 3), associated with the one or more buffers 330, e.g., buffers 330A–C (FIG. 3), are enqueued in BCB free queue 226. In one embodiment, each BCB 320 may be enqueued one at a time in BCB free queue 226 as frame data in each associated buffer 330 is read by PCB 224.

In step 411, when the one or more BCBs 320, e.g., BCBs 320A–C (FIG. 3), associated with the one or more buffers 330, e.g., buffers 330A–C (FIG. 3), have been enqueued in BCB free queue 226, the FCB 310 associated with the one or more BCBs 320, e.g., BCBs 320A–C (FIG. 3) is enqueued in FCB free queue 222.

Although the method and system of the present invention are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

The invention claimed is:

1. A system comprising:
a processor configured to process frames of data, wherein said processor comprises:
a plurality of buffers configured to store said frames of data, wherein each frame of data is associated with a frame control block; and
a plurality of queues configured to temporarily store one or more frame control blocks, wherein each of said one or more frame control blocks comprises one or more qualifier fields, wherein said one or more qualifier fields in said one or more frame control blocks comprise information related to one or more buffers in said plurality of buffers.

2. The system as recited in claim 1, wherein each of said one or more frame control blocks is associated with one or more buffer control blocks, wherein each of said one or more buffer control blocks is associated with a particular buffer of said plurality of buffers.

3. The system as recited in claim 2, wherein said one or more qualifier fields in all but a last frame control block in a particular queue of said plurality of queues comprise information as to a byte count length of said one or more buffer control blocks associated with a next frame control block.

4. The system as recited in claim 1, wherein said one or more qualifier fields in each of said one or more frame control blocks comprise information as to an address of a buffer control block associated with said current frame control block.

5. The system as recited in claim 4, wherein said one or more qualifier fields in each of said one or more frame control blocks comprise information as to a starting byte position and to an ending byte position of frame data stored in a buffer associated with said buffer control block associated with said current frame control block.

6. The system as recited in claim 2, wherein each of said one or more buffer control blocks associated with a particular frame control block comprises one or more qualifier fields, wherein said one or more qualifier fields in all but the last buffer control block of said one or more buffer control blocks associated with said particular frame control block comprise information as to a starting byte position and to an ending byte position of frame data stored in a buffer associated with a next buffer control block.

7. The system as recited in claim 2, wherein each of said plurality of queues comprises a control block, wherein said control block in each of said plurality of queues comprises a head field, wherein said head field comprises an address of a first frame control block in a queue of said plurality of queues.

8. The system as recited in claim 7, wherein said head field further comprises a qualifier, wherein said qualifier comprises information as to a byte count length of said plurality of buffer control blocks associated with said first frame control block.

9. The system as recited in claim 7, wherein said control block further comprises a tail field, wherein said tail field comprises an address of a last frame control block in said queue.

10. The system as recited in claim 7, wherein said control block further comprises a count field, wherein said count field comprises a number of frame control blocks in said queue.

* * * * *